(12) United States Patent
Okamoto et al.

(10) Patent No.: US 6,349,012 B1
(45) Date of Patent: Feb. 19, 2002

(54) MAGNETIC RECORDING AND/OR REPRODUCING APPARATUS

(75) Inventors: Hiroo Okamoto; Nobutaka Amada, both of Yokohama; Hideo Nishijima, Hitachinaka; Shigeru Yamazaki, Yokohama, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/241,059

(22) Filed: Feb. 1, 1999

(30) Foreign Application Priority Data

Feb. 3, 1998 (JP) ............................. 10-021719
Feb. 3, 1998 (JP) ............................. 10-021720

(51) Int. Cl.$^7$ ............................................. G11B 5/584
(52) U.S. Cl. ................................. 360/77.13; 360/70
(58) Field of Search ............................ 360/64, 18, 29, 360/30, 61, 73.05, 73.06, 73.12, 73.13, 77.13, 70; 386/67, 112, 124, 99

(56) References Cited

U.S. PATENT DOCUMENTS

| | | | | |
|---|---|---|---|---|
| 5,465,180 A | * | 11/1995 | Amada et al. | 386/99 |
| 5,740,306 A | * | 4/1998 | Shinohara et al. | 386/67 |
| 5,825,971 A | * | 10/1998 | Inoue et al. | 360/64 X |
| 5,878,010 A | * | 3/1999 | Okamoto et al. | 360/48 X |
| 6,014,278 A | * | 1/2000 | Gotoh et al. | 360/64 |
| 6,038,094 A | * | 3/2000 | Matsumi et al. | 360/70 |
| 6,091,561 A | * | 7/2000 | Hamaguchi | 360/64 |
| 6,097,876 A | * | 8/2000 | Ohishi et al. | 360/32 X |
| 6,104,862 A | * | 8/2000 | Amada et al. | 386/103 |
| 6,115,531 A | * | 9/2000 | Yanagihara | 386/67 |

FOREIGN PATENT DOCUMENTS

| | | | |
|---|---|---|---|
| GB | 2233489 | * | 9/1991 |
| JP | 61-139906 | * | 6/1986 |

\* cited by examiner

*Primary Examiner*—David Hudspeth
*Assistant Examiner*—James L. Habermehl
(74) *Attorney, Agent, or Firm*—Antonelli, Terry, Stout & Kraus, LLP

(57) ABSTRACT

A magnetic recording and/or reproducing apparatus has compatibility with a conventional analog signal recording/reproducing VTR and can realize an operation mode in which a digital signal is recorded and/or reproduced. During N-times long time recording, the travel speed of a magnetic recording medium is set to 1/N of that during normal recording to perform recording every N scanning operations of a rotary head and during N-times long time reproduction, the travel speed of the magnetic recording medium is set to 1/N of that during normal recording and the travel of the magnetic recording medium is controlled such that the level of a reproduction signal reproduced every N scanning operations of the rotary head at a predetermined timing is maximized so as to reproduce a reproduction signal at that timing.

22 Claims, 12 Drawing Sheets

MAGNETIC RECORDING AND/OR REPRODUCING APPARATUS

BACKGROUND OF THE INVENTION

The present invention relates to a magnetic recording and/or reproducing apparatus for recording and/or reproducing an information signal on/from a magnetic recording medium by using a rotary head as well as a magnetic reproducing apparatus for reproducing the information signal and more particularly to a magnetic recording and/or reproducing apparatus for recording and/or reproducing digital signals as well as a magnetic reproducing apparatus for reproducing digital signals.

JP-A-8-194988 discloses a magnetic recording/reproducing apparatus having the tracking function which is stable in each mode, in a VTR for recording/reproducing analog signals and/or digital signals which is compatible with a conventional VTR for recording/reproducing analog signals. The magnetic recording/reproducing apparatus is described as having a long time recording/playback mode even in digital signal recording/reproduction.

In the long time recording/playback mode for digital signals, however, the error rate is degraded when the track pitch is narrowed similarly to the conventional long time recording/playback mode for analog signals, raising a problem that correct reproduction cannot be carried out. Further, the JP-A-8-194988 in no way discloses the high rate recording/reproducing play mode conformable to high-vision video signals.

SUMMARY OF THE INVENTION

An object of the present invention is to provide a magnetic recording and/or reproducing apparatus which is compatible with the conventional analog signal recording/reproducing VTR and which can realize long time recording and/or reproduction for digital signals.

Another object of the present invention is to provide a magnetic recording and/or reproducing apparatus which is compatible with the conventional analog signal recording and/or reproducing VTR and which can realize long time recording/reproduction play and high rate recording/reproducing play for digital signals.

According to one aspect of the present invention, a magnetic recording/reproducing apparatus for recording/reproducing a digital signal on/from a magnetic recording medium by means of a rotary head, comprises a recording/reproducing circuit for recording/reproducing the digital signal, and a servo circuit for controlling the rotation of the rotary head and the travel of the magnetic recording medium, wherein during N-times long time recording, the travel speed of the magnetic recording medium is set to 1/N of that during normal recording by means of the servo circuit to permit he recording/reproducing circuit to perform recording every N scanning operations of the rotary head and during N-times long time reproduction, the servo circuit sets the travel speed of the magnetic recording medium to 1/N of that during normal recording and controls the travel of the magnetic recording medium such that the level of a reproduction signal reproduced every N scanning operations of the rotary head at a predetermined timing is maximized to permit the recording/reproducing circuit to reproduce the reproduction signal at that time.

According to another aspect of the present invention, a magnetic recording/reproducing apparatus for recording/reproducing a digital signal on a magnetic recording medium by means of a rotary head, comprises the rotary head mounted with a first head group including opposingly disposed heads and a second head group including opposingly disposed N sets of heads, a recording/reproducing circuit having N recording signal output terminals and N reproduction signal input terminals, and a servo circuit for controlling the rotation of the rotary head and the travel of the magnetic recording medium, wherein the apparatus has a first recording/reproducing play mode in which during recording, a recording signal delivered out of one of the N recording signal output terminals of the recording/reproducing circuit is supplied to the first head group to perform recording of one track through one scanning operation and during reproduction, a reproduction signal reproduced with the first head group at a rate of one track per scanning operation is supplied to one of the N reproduction signal input terminals, and a second recording/reproducing play mode in which during recording, N recording signals delivered out of N recording signal output terminals of a recording/reproducing circuit and amplifier are supplied to the second head group to perform recording of N tracks through one scanning operation and during reproduction, N reproduction signals reproduced with the second head group at a rate of N tracks per scanning operation are supplied to the recording/reproducing circuit and amplifier to perform reproduction.

DESCRIPTION OF THE PREFERRED EMBODIMENTS

The present invention will now be described by way of example with reference to the accompanying drawings.

Figure 1:
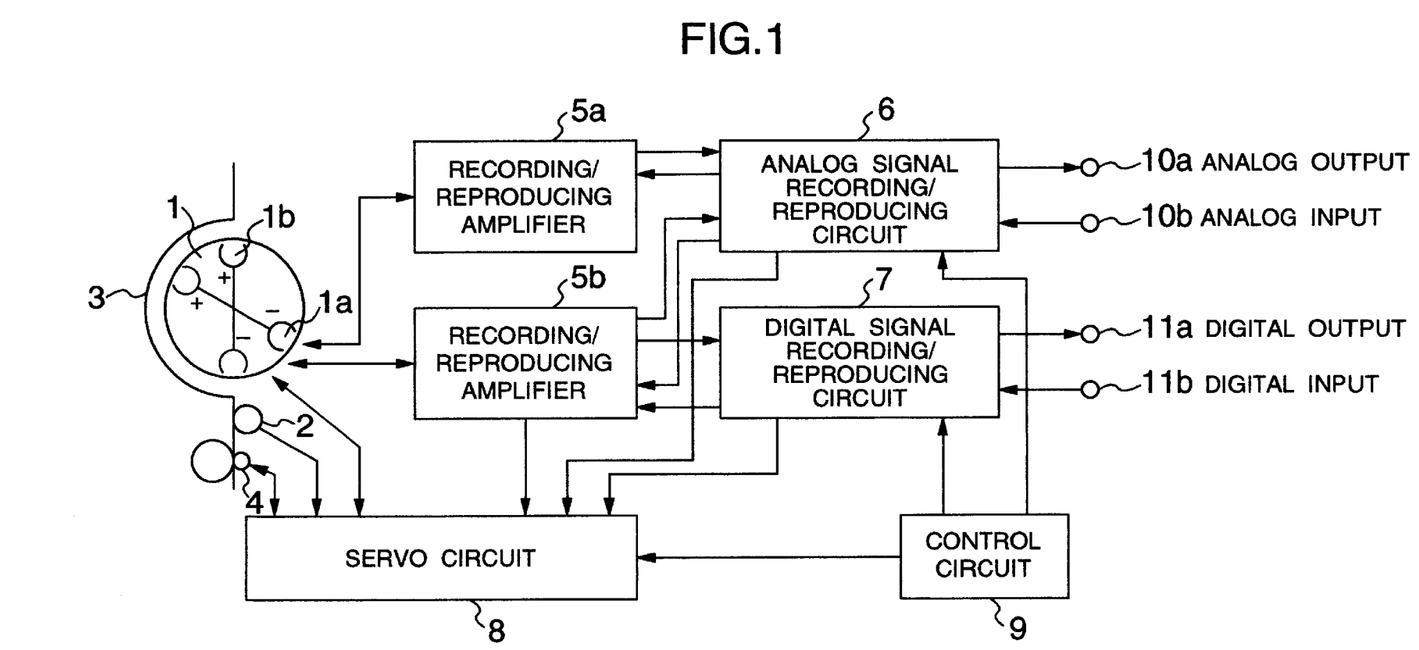
FIG. 1 is a block diagram showing the construction of a magnetic recording/reproducing apparatus of the present invention.

Referring to FIG. 1, a magnetic recording/reproducing apparatus of the present invention is constructed as schematically shown therein. The apparatus for both of recording and reproduction is illustrated in FIG. 1 but the present invention may also be applicable to a recording apparatus and a reproducing apparatus which are independent of each other. The magnetic recording/reproducing apparatus comprises a rotary head 1, a recording/reproducing head 1a for analog video signals mounted to the rotary head 1, a recording/reproducing head 1b for analog audio signals and digital signals mounted to the rotary head 1, a recording/reproducing head 2 for a control (CTL) signal used for tracking, a magnetic tape 3, a capstan 4 adapted to control the travel of the magnetic tape 3, a recording/reproducing amplifier 5a for performing recording/reproduction in association with the head 1a, a recording/reproducing amplifier 5b for performing recording/reproduction in association with the head 1b, an analog signal recording/reproducing circuit 6 for performing recording/reproduction of analog signals, a digital signal recording/reproducing circuit 7 for performing recording/reproduction of digital signals, a servo circuit 8 for controlling the rotary head 1 and the capstan 4, a control circuit 9 for controlling the operation mode and the like of the recording/reproducing apparatus, an analog signal output terminal 10a, an analog signal input terminal 10b, a digital signal output terminal 11a and a digital signal input terminal 11b.

Firstly, the operation during normal recording/reproduction will be described.

During recording of analog signals, an analog video signal and an analog audio signal which are inputted from the input terminal 10b are converted into recording signals by means of the analog recording/reproducing circuit 6. Then, the analog video signal is amplified to a predetermined level by means of the recording/reproducing amplifier 5a and inputted to the head 1a so as to be recorded on the magnetic tape 3. The analog audio signal is amplified to a predetermined level by means of the recording/reproducing amplifier 5b and inputted to the head 1b so as to be recorded on the magnetic tape 3. At that time, the servo circuit 8 controls the rotation of the rotary head 1 to bring it into synchronism with a vertical synchronizing signal of the video signal delivered out of the analog recording/reproducing circuit 6. A CTL signal is recorded on the magnetic tape 3 by means of the head 2 once a rotation of the rotary head 1 at a predetermined timing.

During reproduction of analog signals, the servo circuit 8 controls the capstan 4 such that tracking can be optimized in accordance with the level of CTL signal or reproduction signal. Then, a video signal reproduced with the head 1a and an audio signal reproduced with the head 1b are amplified by the recording/reproducing amplifiers 5a and 5b, respectively, and inputted to the analog recording/reproducing circuit 6. These signals are subjected to predetermined processes in the circuit 6 and delivered out of the output terminal 10a.

In a long time recording/playback mode during analog recording/reproduction, the recording/reproducing operation is the same as that during normal recording/reproduction with the only exception that the travel speed of the magnetic tape 3 is decreased, that is, the track pitch is narrowed.

During recording of digital signals, a digital signal inputted from the input terminal 11b is converted into a recording signal of a predetermined format by means of the digital signal recording/reproducing circuit 7. Then, the digital signal is amplified to a predetermined level by means of the recording/reproducing amplifier 5b and inputted to the head 1b so as to be recorded on the magnetic tape 3. At that time, the servo circuit 8 controls the rotation of the rotary head 1 to bring it into synchronism with a reference signal delivered out of the digital recording/reproducing circuit 7. Also, the CTL signal is recorded on the magnetic tape 3 by means of the head 2 once a rotation of the rotary head 1 at a predetermined timing.

During reproduction of digital signals, the servo circuit 8 controls the capstan 4 such that tracking can be optimized in accordance with the level of CTL signal or reproduction signal, as in the case of the operation during reproduction of analog signals. Then, a digital signal reproduced with the head 1b is amplified at the recording/reproducing amplifier 5b, inputted to the digital recording/reproducing circuit 7 so as to undergo a predetermined process such as error correction and delivered out of the output terminal 11a.

In FIG. 1, the recording/reproduction of analog audio signals and that of digital signals are carried out by using the same head but obviously, they may be carried out by means of heads which are independent of each other.

Figure 2:
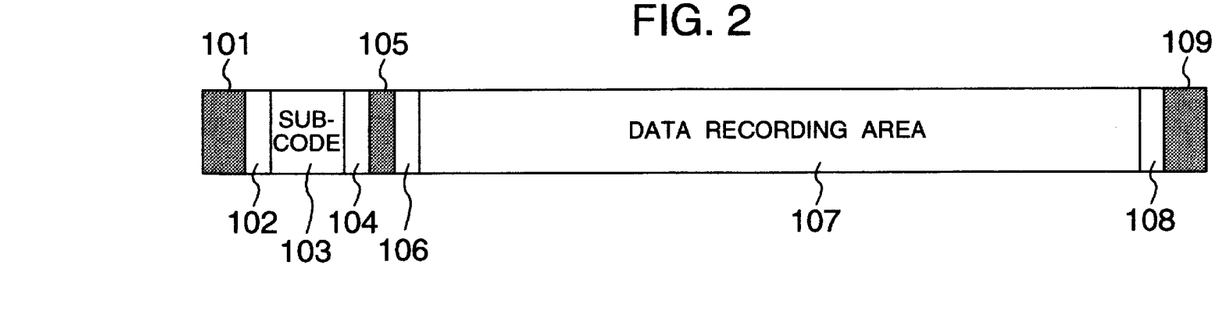
FIG. 2 is a diagram showing a recording pattern of one track during recording of a digital signal.

Referring to FIG. 2, there is illustrated a recording pattern of one track at the time of recording of digital signals. A sub-code recording area 103 records sub-codes such as time information and program information, a data recording area 107 records digital signals, areas 102 and 106 are preambles to the respective recording areas, areas 104 and 108 are post-ambles of the respective recording areas, a gap 105 is interposed between the respective recording areas, and margins 101 and 109 are provided at opposite track ends.

Figure 3:
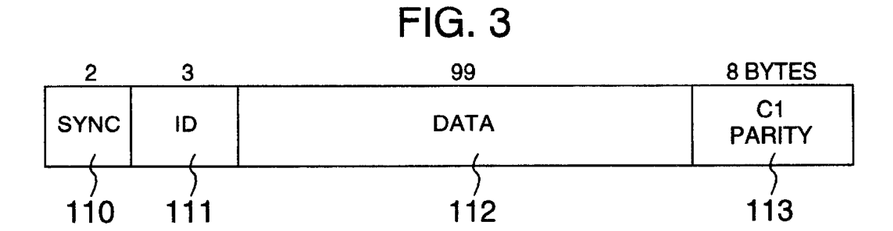
FIG. 3 is a diagram showing the structure of one block in a data recording area of FIG. 2.

A structure of one block in the data recording area 107 shown in FIG. 2 is depicted in FIG. 3. The data block includes a synchronizing signal 110, ID information 111 such as a block address, data 112 and a parity (C1 parity) 113 for first error detection correction. For example, the synchronizing signal 110 has 2 bytes, the ID information 111 has 3 bytes, the data 112 has 99 bytes and the parity 113 has 8 bytes, so that the one block has 112 bytes.

Figure 4:
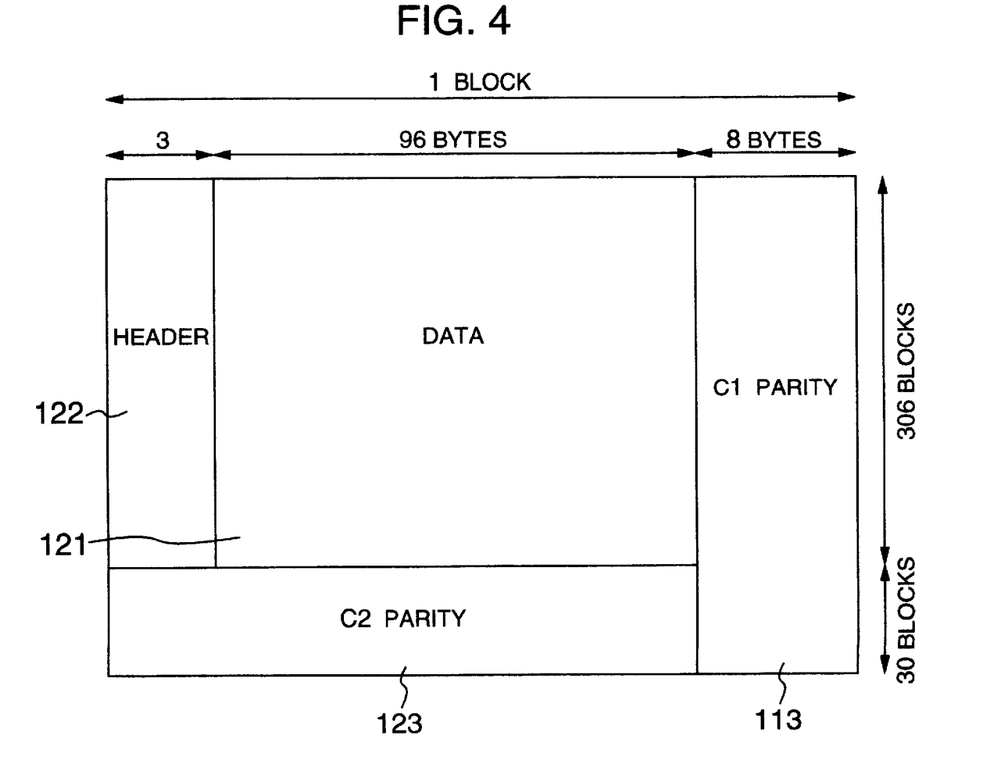
FIG. 4 is a diagram showing the structure of data for one track in the data recording area of FIG. 2.

A structure of data for one track in the data recording area 107 shown in FIG. 2 is depicted in FIG. 4, with the synchronizing signal 110 and ID information 111 omitted. The data recording area 107 consists of, for example, 336 blocks and the data 112 is recorded on precedent 306 blocks and second error correction codes (C2 parity) 123 are recorded on the succeeding 30 blocks. The C2 parity 123 is provided in a unit of, for example, 6 tracks. A data amount for 306 blocks×6 tracks is divided by 18 and a C2 parity of 10 blocks is added to each of the 102 blocks. For example, a Reed Solomon code may be used as the error correction code. The data 112 of 99 bytes for each block consists of a header 122 of 3 bytes and data 121 of 96 bytes.

Figure 5:
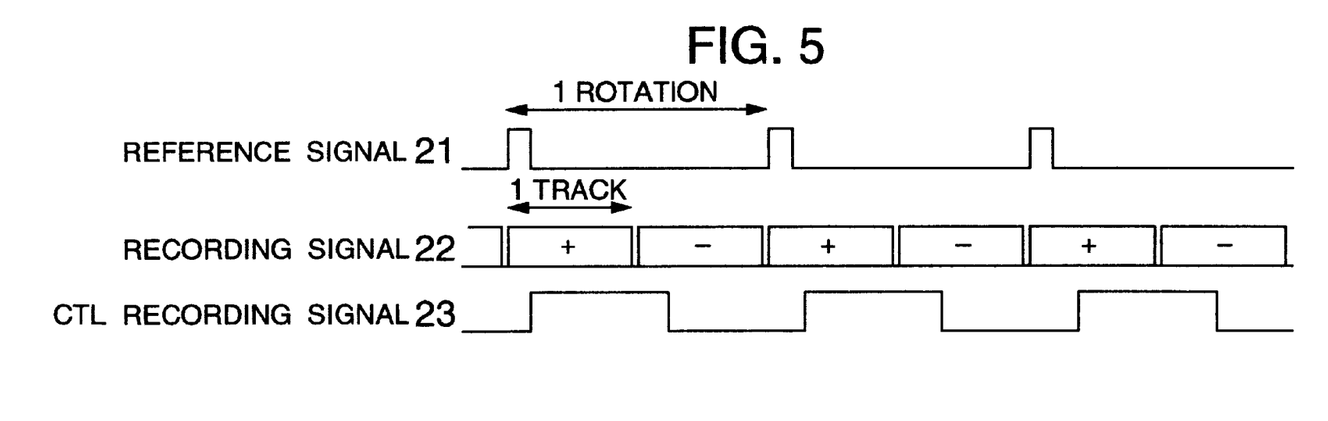
FIG. 5 is a timing chart during recording of digital signals.

Referring to FIG. 5, the timing during recording of digital signals is depicted. A reference signal 21 and a recording signal 22 are delivered out of the digital recording/reproducing circuit 7 and a CTL recording signal 23 is delivered from the servo circuit 8 to the head 2. The recording signal 22 delivered out of the digital recording/reproducing circuit 7 is in a predetermined timing relationship with the reference signal 21 also delivered out of the digital recording/reproducing circuit 7. For example, the reference signal 21 is delivered at a leading position of a positive (+) azimuth track. Of course, the reference signal 21 may be delivered at a timing for another position. Instead of the delivery effected once a rotation, the reference signal 21 may be delivered, for example, once a track. In the servo circuit 8, the rotation of the rotary head 1 is controlled such that the recording signal can be recorded at a predetermined position on magnetic tape 3 in relation to a criterion of the reference signal 21. For tracking during reproduction, the CTL recording signal 23 is delivered to the head 2 once a rotation at a predetermined timing so as to be recorded on the magnetic tape 3.

Figure 6:
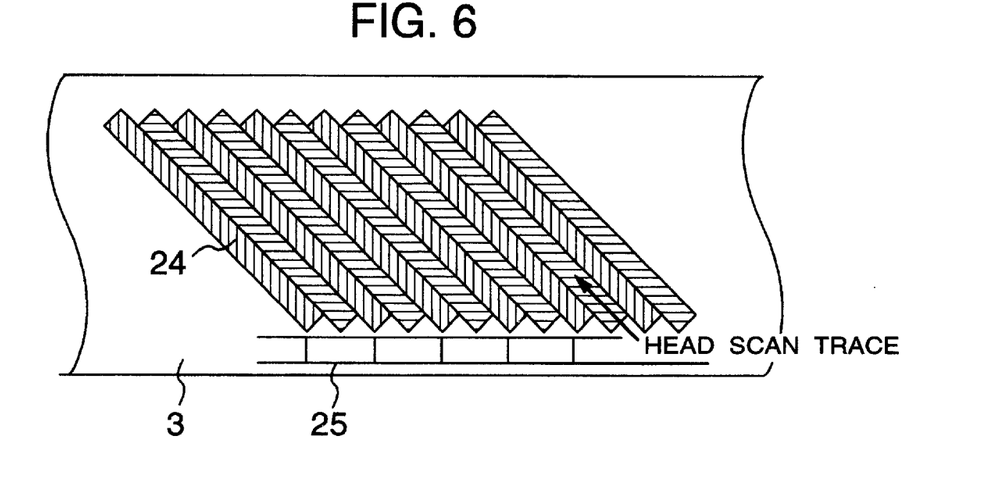
FIG. 6 is a diagram showing a recording pattern on a magnetic tape.

FIG. 6 diagrammatically shows a recording pattern on the magnetic tape 3. In the figure, reference numeral 24 designates one track and 25 designates the CTL signal.

Next, the operation during long recording/reproducing play for digital signals will be described.

During long recording play for digital signals, the speed of the rotary head 1 is set to the same as that during normal recording and only the travel speed of the magnetic tape 3 is decreased to change the recording timing.

Figure 7:
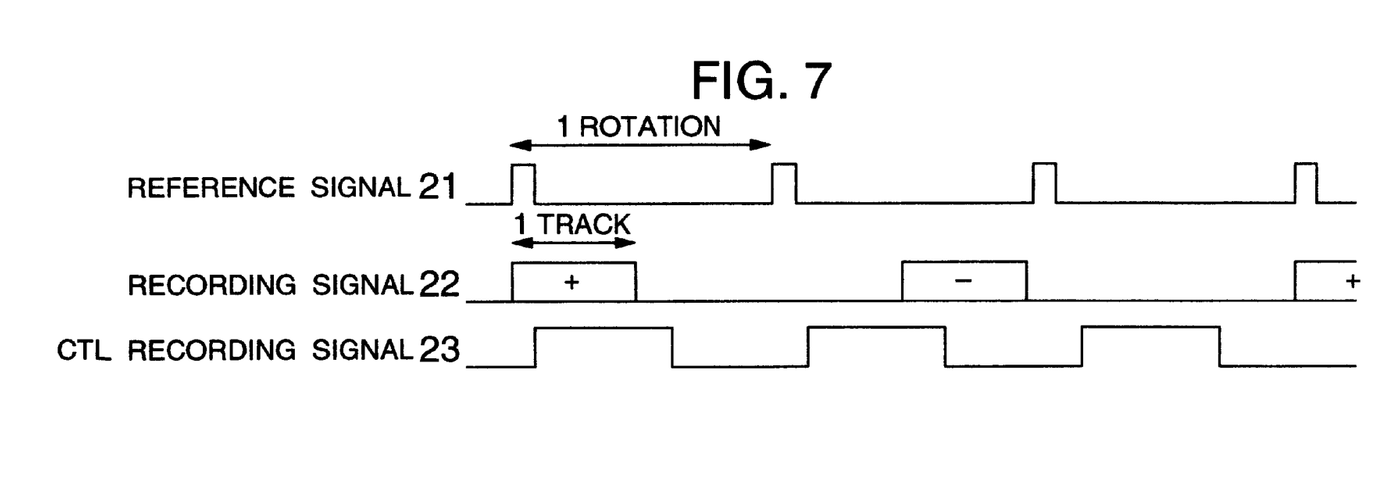
FIG. 7 is a timing chart during three-times long time recording.

FIG. 7 is a diagram showing the timing during triple long recording play. In this case, the travel speed of the magnetic tape 3 is lowered to ⅓ of that during normal recording. On the other hand, the reference signal 21 is set to the same as that during normal recording shown in FIG. 5, leading to the same speed of the rotary head 1 as that during normal recording. The recording signal 22 is recorded every three tracks. This ensures that the rate of signals to be recorded is decreased to ⅓ of that during normal recording but the track pitch and the recording frequency can be identical to those during normal recording. The CTL recording signal has the same period as that during normal recording shown in FIG. 5 and is therefore recorded once a rotation of the rotary head 1.

Figure 8:
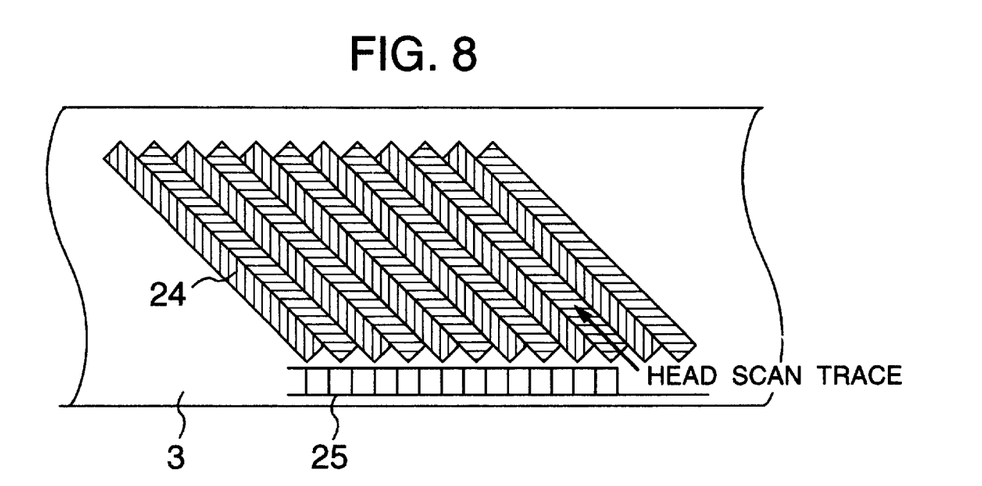
FIG. 8 is a diagram showing a recording pattern on the magnetic tape.

FIG. 8 is a diagram showing a recording pattern on the magnetic tape 3. The CTL signal 25 is recorded once a rotation of the rotary head 1 and is therefore recorded thrice 2 tracks. But the number of recording operations per travel time of the magnetic tape 3 is the same as that during normal recording and consequently, the travel of the magnetic tape 3 can be controlled during three times long time reproduction in the same way as that during normal reproduction.

During N-times long time recording other than the triple long recording play, the recording signal 22 may be recorded every N tracks. During odd-times long time recording/ reproduction such as three-times long time recording/ reproduction, recording/reproduction can be carried out by using the same head construction as that used during normal recording/reproduction.

Figure 9:
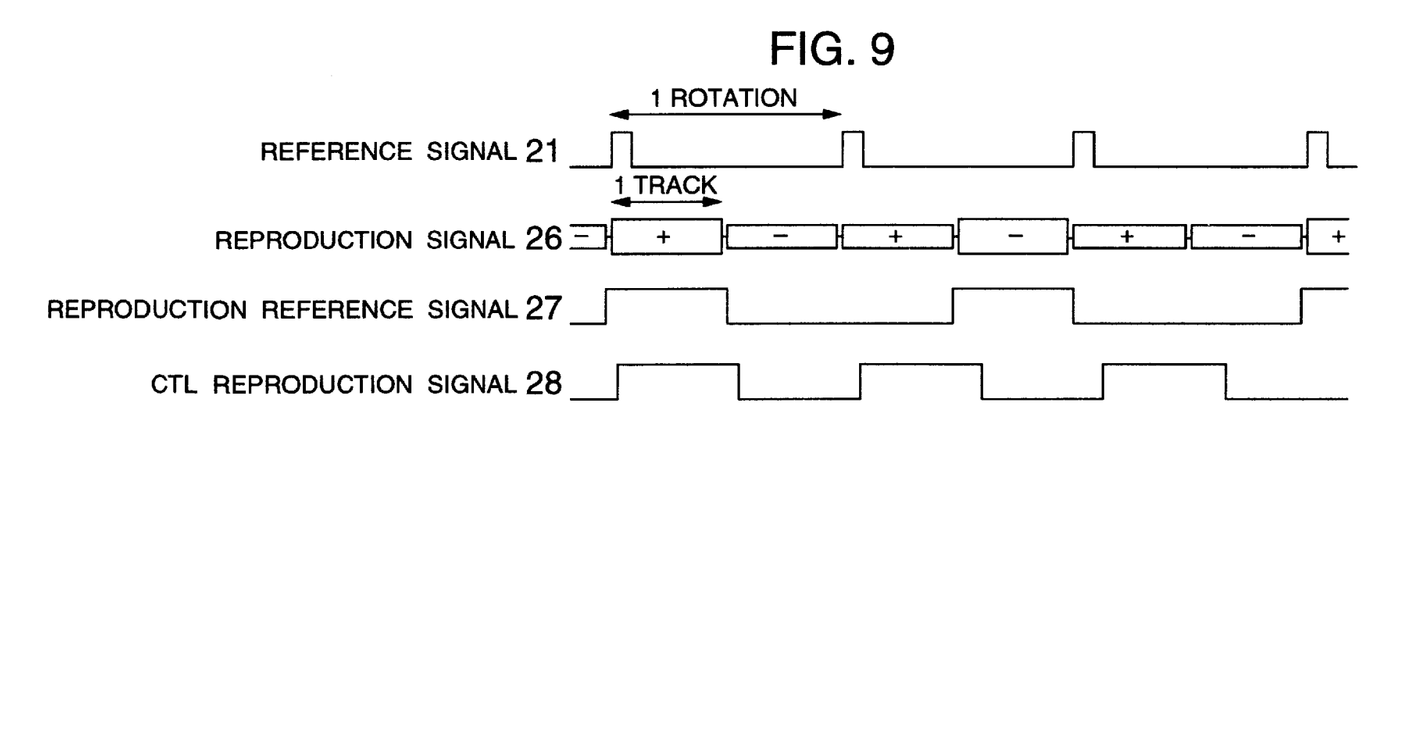
FIG. 9 is a timing chart during three-times long time reproduction.

FIG. 9 is a diagram showing the timing during triple long reproducing play. Illustrated in the figure are a reproduction signal 26 reproduced with the rotary head, a reproduction reference signal 27 and a CTL reproduction signal 28. During reproduction, the rotation of the rotary head 1 and the travel speed of the magnetic tape 3 can be set to the same values as those during recording by controlling the rotation of the rotary head 1 to bring it into a predetermined phase relationship with the reference signal 21 and controlling the travel speed of the magnetic tape 3 to bring the CTL reproduction signal 28 into a constant phase relationship with the reference signal 21. At that time, the head scans thrice a track. Accordingly, as shown at reproduction signal 26, the track is scanned correctly every three scanning operations. Thus, the reproduction reference signal 27 which assumes a high level every 3 tracks is generated. Then, the level of the reproduction signal 26 is detected when the reproduction reference signal is high, and tracking is carried out to maximize the detected level. The reproduction signal having the maximum level is inputted to the digital recording/reproducing circuit 7 of FIG. 1 to perform the reproducing process. The reproduction reference signal 27 may be formed by either the digital recording/reproducing circuit 7 or the servo circuit 8.

Detection of the reproduction signal level and tracking can be realized through a method similar to auto-tracking described in JP-A-8-194988 mentioned hereinbefore. During N-times long time reproduction play other than the triple long reproducing play, the reproduction reference signal 27 may be rendered high every N scanning operations.

Figure 10:
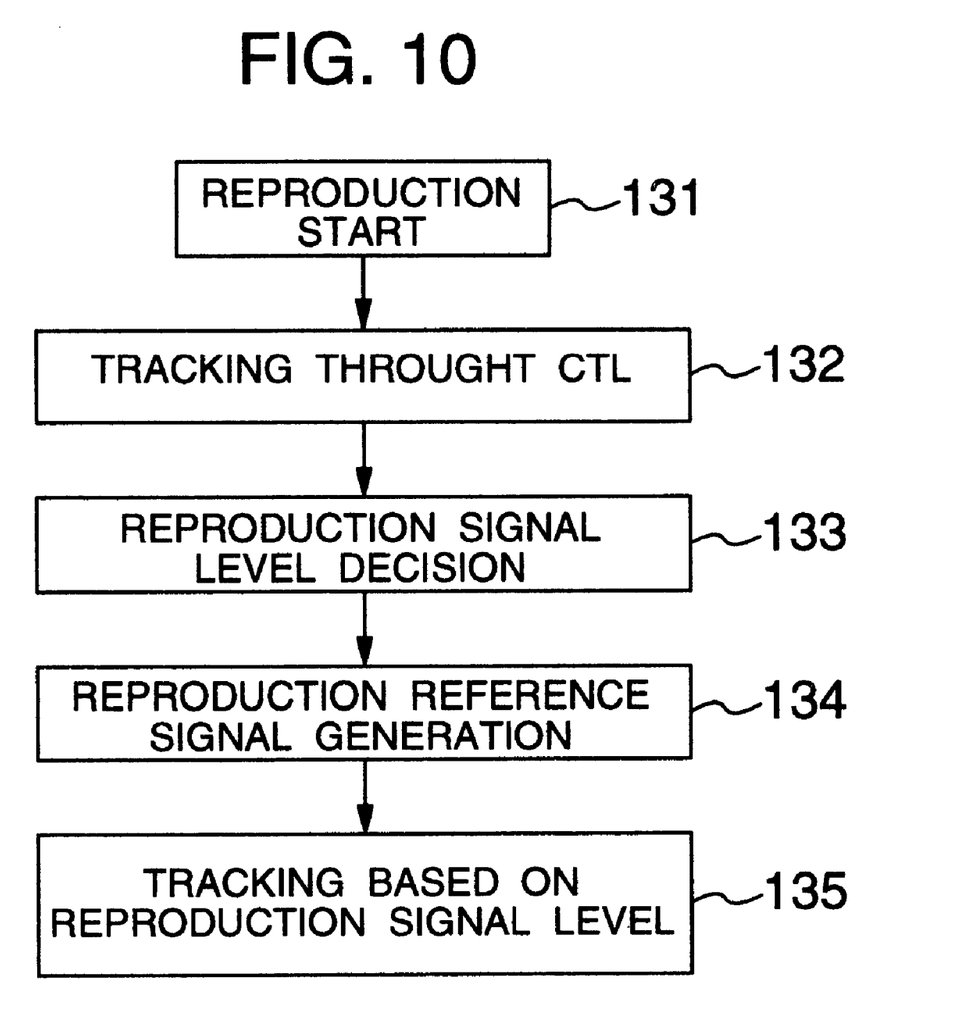
FIG. 10 is a flow chart showing another embodiment of the operation during long time reproduction.

Referring to FIG. 10, there is illustrated a flow chart showing another embodiment of the operation during long reproducing play. After start of reproduction (131), tracking is first carried out through only CTL (132). Then, levels of consecutive N reproduction signals are detected to decide a position at which the maximum level is obtained (133) and a reproduction reference signal 27 is generated in conformity with that position (134). Thereafter, by using the thus generated reproduction reference signal 27 as a criterion, tracking is carried out on the basis of the reproduction signal level such that the level of a reproduction signal at a position taking place every N scanning operations can be maximized (135). Through this, the tracking pull-in time during start of reproduction can be shortened.

In the digital recording/reproducing circuit 7, even without determining the position of the reproduction signal by the reproduction reference signal 27, a position at which the error is minimized by the error detection correction for the reproduction signal can be determined as the position at which correct reproduction is effected. Regardless of position, all signals (blocks) which can be reproduced without error may be subjected to the reproduction process.

Figure 11:
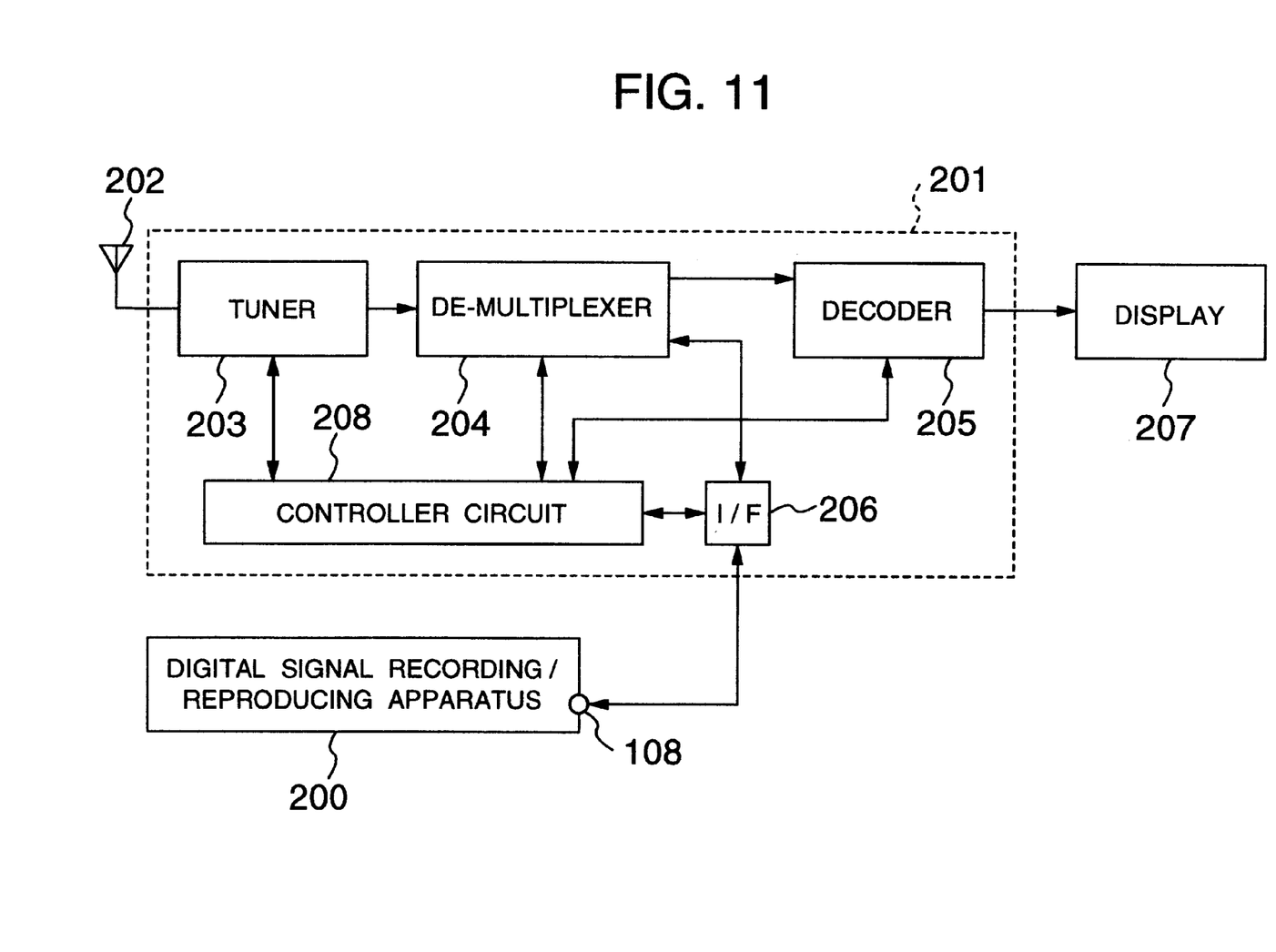
FIG. 11 is a block diagram of a system having the magnetic recording/reproducing apparatus of the present invention connected to a digital broadcasting receiver.

Referring to FIG. 11, there is illustrated, in block form, a system in which the magnetic recording/reproducing apparatus of the present invention is connected to a digital broadcasting receiver to perform recording/reproduction of digital broadcasting signals. The system comprises a magnetic recording/reproducing apparatus 200, a digital broadcasting receiver 201, an antenna 202 and a display 207. The digital broadcasting receiver 201 includes a tuner 203, a de-multiplexer 204, a decoder 205, an interface circuit 206, and a controller circuit 208 for controlling the operation of the digital broadcasting receiver 201.

A digital broadcasting signal received at the antenna 202 is demodulated by the tuner 203 and a necessary digital compressed video signal is selected by the de-multiplexer 204. The thus selected digital compressed video signal is decoded into an ordinary video signal by means of the decoder 205 and delivered to the display 207. When the received signal has been processed by, for example, scramble, it is released from scramble by means of the de-multiplexer 204 and thereafter subjected to the decoding process. In recording, the de-multiplexer 204 selects the digital compressed video signal to be recorded and information concerned therewith. The thus selected signal and information are delivered toward the magnetic recording/ reproducing apparatus 200 through the interface circuit 206 so as to be supplied to the digital magnetic recording/ reproducing apparatus 200 by way of an input/output terminal 108. A digital compressed video signal or the like reproduced from the magnetic recording/reproducing apparatus 200 is delivered to the interface circuit 206 through the input/output terminal 108. The interface circuit 206 applies the input signal to the de-multiplexer circuit 206. The de-multiplexer circuit 204 and decoder circuit 205 apply a process similar to that during normal reception to the received signal and deliver a processed signal to the display 207.

Figure 12:
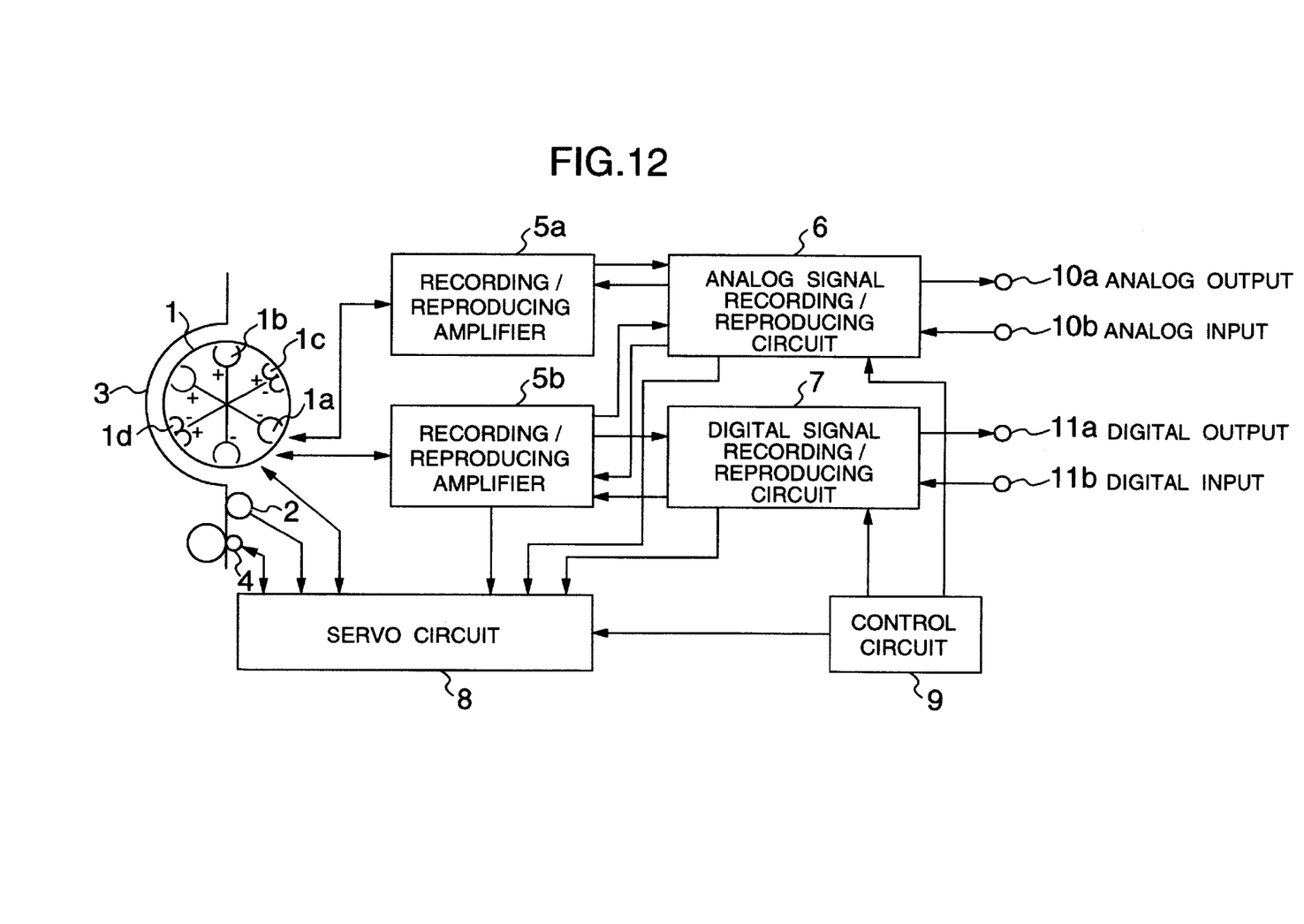
FIG. 12 is a block diagram showing another embodiment of the magnetic recording/reproducing apparatus according to the invention.

Referring to FIG. 12, the magnetic recording/reproducing apparatus of the present invention is configured for high rate recording/playback mode as shown therein. Heads 1c and 1d are recording/reproducing heads used during high rate recording/playback mode. During the normal recording/reproduction and in the long recording/playback mode for digital signals, recording/reproduction is carried out with the head 1b and during high rate recording/playback mode, the travel speed of the magnetic tape 3 is doubled as compared to that during normal recording/reproduction and recording/reproduction for two channels is carried out with the heads 1c and 1d each of which has the same azimuth angle as that of the head 1b and has adjacently disposed positive (+) azimuth and negative (−) azimuth heads. With this construction, during high rate recording/playback mode, recording/reproduction can be effected at a rate which is twice the rate during normal recording/reproduction by using the same track pattern as that during the normal recording/reproduction and in the long recording/playback mode. The adjoining heads of each of the heads 1c and 1d are not always disposed in such a proximity relationship as shown in FIG. 12. If they are not in close proximity to each other, the timings for recording signals of two channels to be described later may be displaced in accordance with the distance between positions at which the heads are mounted. Of course, recording/reproduction at a rate of N multiple other than the double rate can be carried out by adding 2N heads. Further, instead of providing the heads 1c and 1d independently of each other, only a head 1b may be used provided that second + azimuth and − azimuth and heads having different azimuth angles from those of + azimuth and − azimuth heads of the head 1b are disposed adjacently to the + and − azimuth heads of the head 1b. In this case, only the head of the first azimuth angle is used during the normal recording/reproduction and in the long recording/reproducing play mode but recording of two channels is carried out in the high rate recording/playback mode by using the head of the first azimuth angle and the head of the second azimuth angle.

Figure 13:
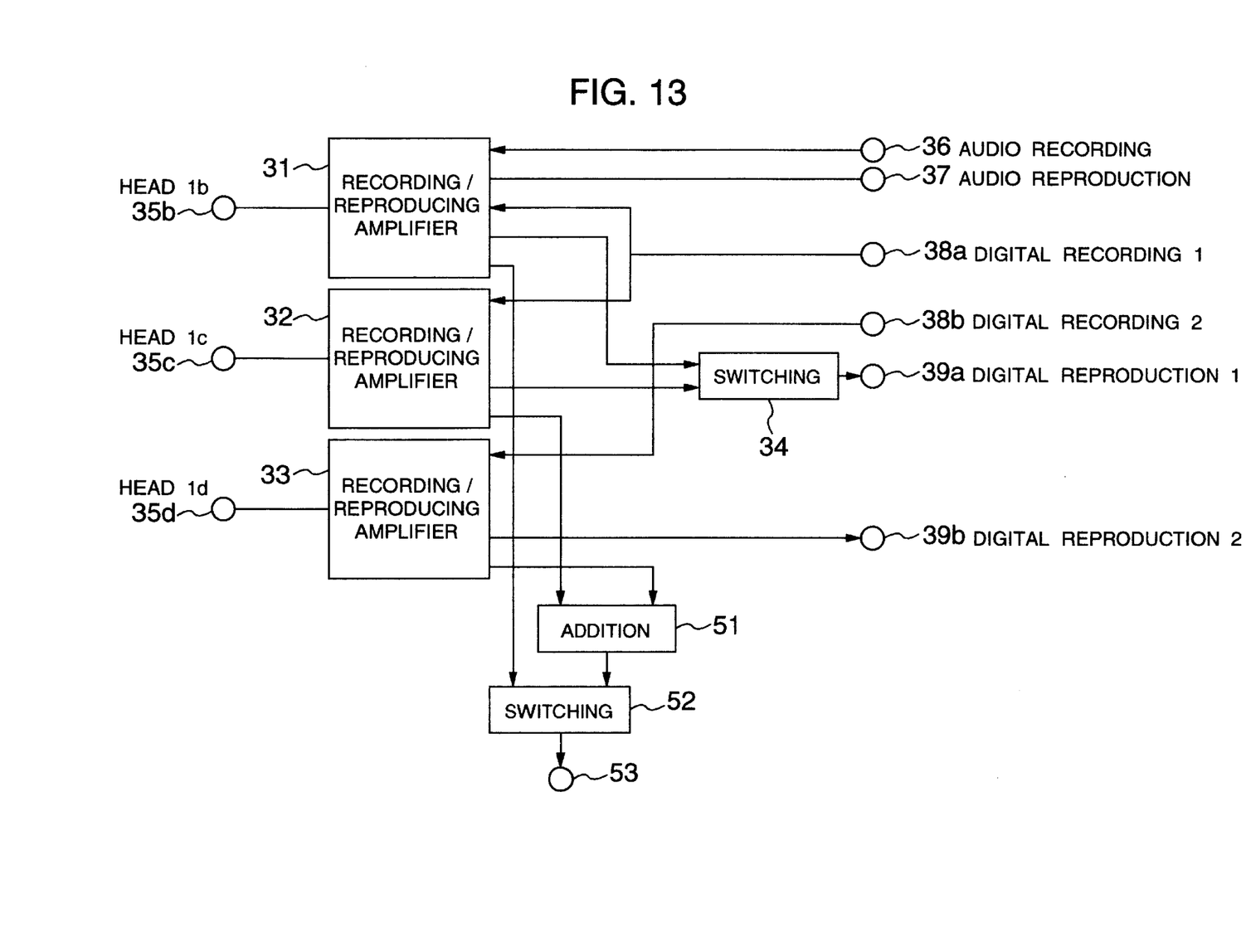
FIG. 13 is a block diagram showing the construction of a recording/reproducing amplifier of FIG. 12.

Referring to FIG. 13, the recording/reproducing amplifier 5b of FIG. 12 is constructed as shown therein. The recording/reproducing amplifier 5b includes recording/reproducing amplifiers 31, 32 and 33 for performing recording/reproduction in association with the heads 1b, 1c and 1d of FIG. 12, respectively, which are connected to terminals 35b, 35c and 35d, respectively, switching circuits 34 and 52, an adder circuit 51, an audio signal input terminal 36, an audio signal output terminal 37, digital recording signal input terminals 38a and 38b and digital reproduction signal output terminals 39a and 39b.

During analog recording, an analog audio signal applied to the input terminal 36 is amplified to a predetermined level by means of the recording/reproducing amplifier 31 and recorded on the magnetic tape 3 by means of the head 1b. During analog reproduction, an audio signal reproduced with the head 1b is amplified to a predetermined level by means of the recording/reproducing amplifier 31 and delivered to the analog/reproducing circuit 6 of FIG. 12 through the output terminal 37. In the case of normal recording/playback mode and long time recording/playback mode for digital signals, a digital recording signal applied to the input terminal 38a during recording is amplified to a predetermined level by means of the recording/reproducing amplifier 31 and recorded on the magnetic tape 3 by means of the head 1b. During reproduction, a digital signal reproduced with the head 1b is amplified to a predetermined level by means of the recording/reproducing amplifier 31 and delivered to the digital recording/reproducing circuit 7 of FIG. 12 through the switching circuit 34 and output terminal 39a. In the recording/playback mode, a reproduction signal reproduced by the recording/reproducing amplifier 31 during reproduction is delivered to the servo circuit 8 of FIG. 12 through the switching circuit 52 and output terminal 53, so that tracking is carried out such that the level of the reproduction signal is maximized.

In the case of high rate recording/playback mode for digital signals, recording signals of two channels delivered out of the digital recording/reproducing circuit 7 of FIG. 12 during recording are inputted through the input terminals 38a and 38b of FIG. 13. Then, they are amplified to predetermined levels by means of the recording/reproducing amplifiers 32 and 33 and recorded on the magnetic tape 3 by means of the heads 1c and 1d of FIG. 12. During reproduction, digital signals reproduced with the heads 1c and 1d are amplified to predetermined levels by means of the recording/reproducing amplifiers 32 and 33 of FIG. 13 and delivered to the digital recording/reproducing circuit 7 of FIG. 12 through the output terminals 39a and 39b. Reproduction signals from the recording/reproducing amplifiers 32 and 33 of FIG. 13 are added to each other by means of the adder circuit 51 and a resulting signal is delivered to the servo circuit 8 of FIG. 12 through the switching circuit 52 and output terminal 53, so that tracking is carried out such that the sum of levels of the reproduction signals of two channels can be maximized. Through this, optimum tracking can be effected for tracks of two channels which are reproduced simultaneously. Alternatively, the levels of the reproduction signals of two channels may be detected independently and resulting levels may be added together. Further, tracking may be carried out in such a manner that both of reproduction levels of the respective channels exceed a constant level.

Figure 14:
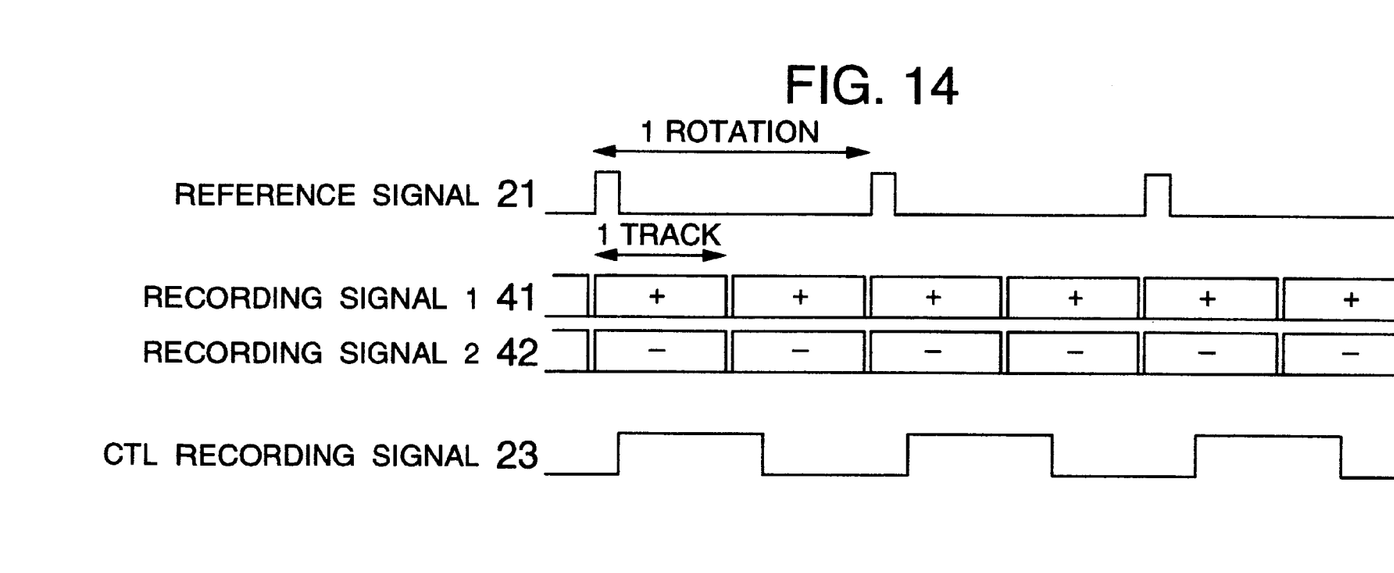
FIG. 14 is a timing chart during double high rate recording play for digital signals.

FIG. 14 is a diagram showing the timing during double high rate recording/playback mode. In this case, the travel speed of the magnetic tape 3 is doubled as compared to that during normal recording. On the other hand, the same reference signal 21 as that in FIG. 5 is used during normal recording. In other words, the speed of the rotary head 1 is set to the same as that during normal recording. In recording signals 41 and 42, two tracks are recorded simultaneously. This ensures that the rate of recordable signals can be doubled and the same as those during normal recording. A CTL recording signal has the same period as that during normal recording in FIG. 5 and is therefore recorded once a rotation of the rotary head 1.

Figure 15:
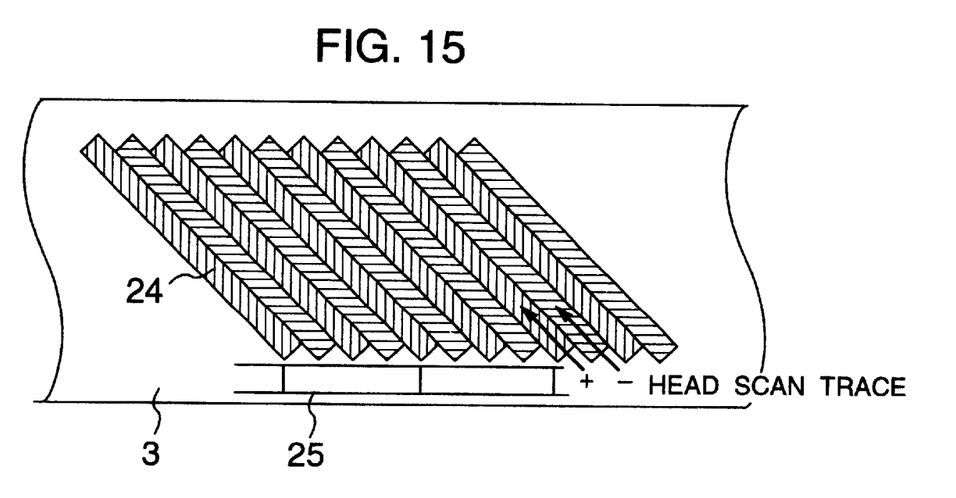
FIG. 15 is a diagram showing a recording pattern on the magnetic tape.

FIG. 15 is a diagram showing a recording pattern on the magnetic tape 3. Since the CTL signal 25 is recorded once a rotation of the rotary head 1, it is recorded every four tracks but since the number of recording operations per travel time of the magnetic tape 3 is the same as that during normal recording, the travel of the magnetic tape 3 during reproduction can be controlled in the same way as that during normal reproduction.

Figure 16:
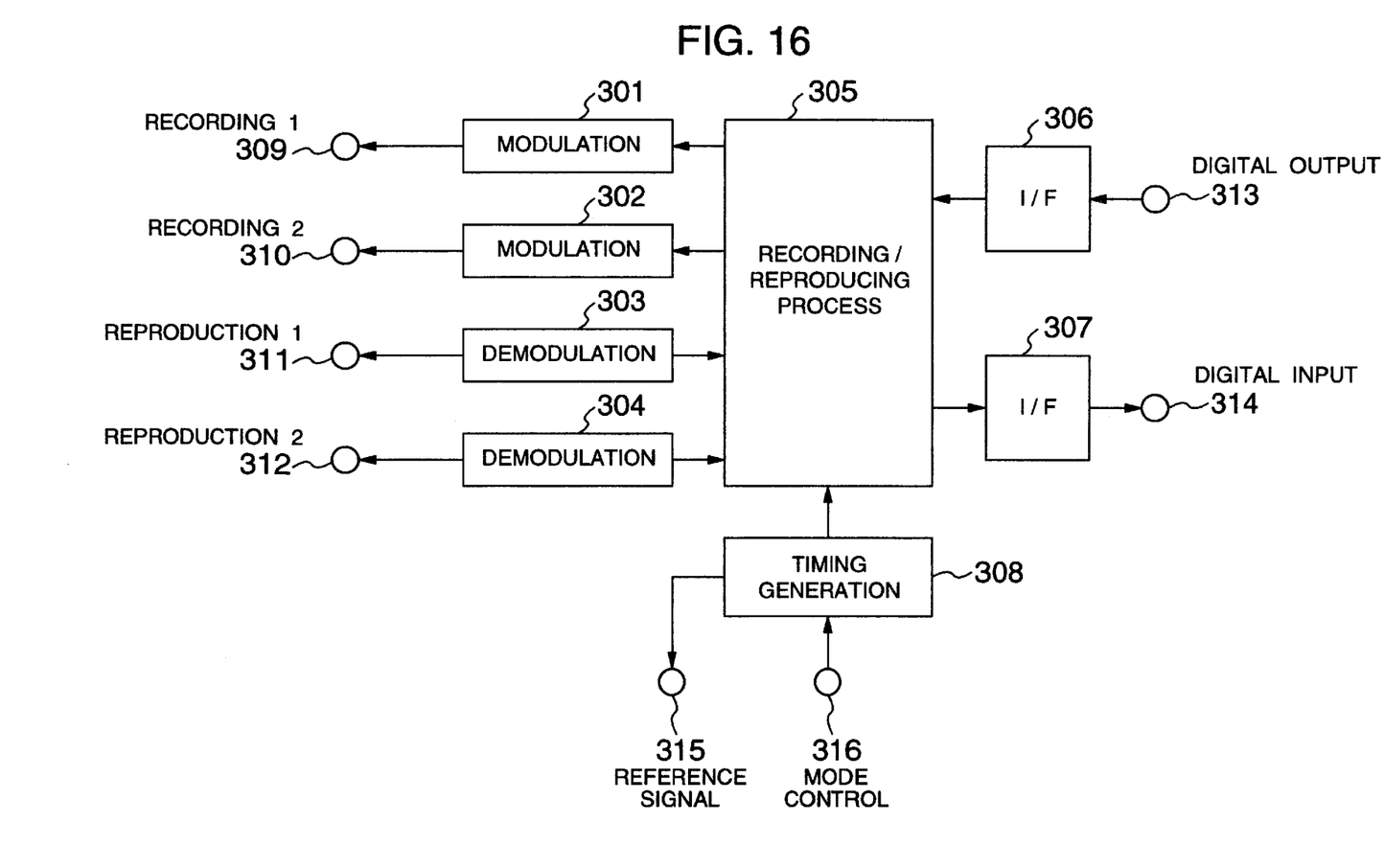
FIG. 16 is a block diagram showing the construction of a digital signal recording/reproducing circuit of FIG. 12.

Referring to FIG. 16, the digital recording/reproducing circuit 7 of FIG. 12 is constructed as shown therein. More particularly, the digital recording/reproducing circuit 7 includes modulator circuits 301 and 302, demodulator circuits 303 and 304, a recording/reproducing processing circuit 305, interface circuits 306 and 307, a timing generator circuit 308, recording signal output terminals 309 and 310, reproduction signal input terminals 311 and 312, a digital signal input terminal 313, a digital signal output terminal 314, an input terminal 316 for a recording/playback mode control signal supplied from the controller circuit 9 of FIG.

12 and an output terminal 315 for a reference signal delivered to the servo circuit 8 of FIG. 12.

During the normal recording and in the long recording play mode for digital signals, a digital signal inputted from the input terminal 313 is supplied to the recording/reproducing processing circuit 305 through the interface circuit 306. In the recording/reproducing processing circuit 305, the digital signal is applied with such a process as addition of an error correction code to generate a recording signal at the timing shown in FIG. 5 or FIG. 7. The thus generated recording signal is modulated by means of the modulator circuit 301 and then delivered to the recording/reproducing amplifier 5b through the output terminal 309. At that time, delivery of output from the modulator circuit 302 is stopped. During the normal reproduction and in the long reproducing play mode for digital signals, a reproduction signal inputted from the input terminal 311 is demodulated by means of the demodulator circuit 303 and applied to the recording/reproducing processing circuit 305. In the recording/reproducing processing circuit 305, the demodulated signal is applied with such a process as addition of an error correction code and then delivered to the output terminal 314 through the interface circuit 307.

In the high rate recording play mode for digital signals, a digital signal inputted from the input terminal 313 is supplied to the recording/reproducing processing circuit 305 through the interface circuit 306. In the recording/reproducing processing circuit 305, the digital signal is applied with a process such as addition of an error correction code similarly to the normal recording and long recording play to generate a recording signal and the recording signal is distributed to two channels at the timing shown in FIG. 14. The signals of two channel are modulated in the modulator circuits 301 and 302, respectively, and then delivered to the recording/reproducing amplifier 5b of FIG. 12 through the output terminals 309 and 310. In the high rate reproducing play mode for digital signals, reproduction signals of two channels inputted from the input terminals 311 and 312 are demodulated by the demodulator circuits 303 and 304 and then supplied to the recording/reproducing processing circuit 305. In the recording/reproducing processing circuit 305, the digital signals are applied with such a process as addition of an error correction code similarly to the normal reproduction and long time reproduction and the thus processed signals are delivered from the output terminal 314 through the interface circuit 307.

In the recording/reproducing processing circuit 305, the same process is carried out for any modes with only exception that the rate for processing is changed, so that either generation or reproduction of data for track of FIG. 2 can be effected in any modes.

The construction for double high rate recording/playback is illustrated in FIG. 16 but N-times high rate recording/playback can be carried out by using N modulator circuits and N demodulator circuits.

According to the present invention, long time recording/playback for digital signals can be ensured by making, during N-times long time recording, the rotation of the rotary head and recording of the CTL signal identical to those during normal recording to record a signal every N scanning operations and by effecting, during N-times long time reproduction, tracking such that the reproduction level of a reproduction signal reproduced every N scanning operations is maximized.

Further, high rate recording/reproduction for digital signals can be ensured by making, during N-times high rate recording, the rotation of the rotary head and recording of the CTL signal identical to those during normal recording to record signals of N-channels and by effecting, during N-times high rate reproduction, tracking such that the reproduction level of each of the reproduction signals of N channels is optimized.

What is claimed is:

1. A magnetic recording apparatus for recording a digital signal on a magnetic recording medium by means of a rotary head, comprising:
   a recording circuit recording said digital signal; and
   a servo circuit controlling the rotation of said rotary head and the travel of said magnetic recording medium,
   wherein during N-times long time recording, the travel speed of said magnetic recording medium is set to 1/N of that during normal recording by means of said servo circuit and said recording circuit records one track recording data every N scanning operations of said rotary head,
   during N-times high rate recording, the travel speed of said magnetic recording medium is set to N of that during normal recording by means of said servo circuit and recording circuit records N tracks recording data every one scanning operation of said rotary head, and
   in each of the N-times long time recording and the N-times high rate recording, said servo circuit records a tracking signal on said magnetic recording medium at a period corresponding to once per rotation of said rotary head.

2. A magnetic recording/reproducing apparatus for recording/reproducing a digital signal on/from a magnetic recording medium by means of a rotary head, comprising:
   a recording/reproducing circuit recording/reproducing said digital signal; and
   a servo circuit controlling the rotation of said rotary head and the travel of said magnetic recording medium,
   wherein during N-times long time recording, the travel speed of said magnetic recording medium is set to 1/N of that during normal recording by means of said servo circuit to permit said recording/reproducing circuit to perform recording every N scanning operations of said rotary head and during N-times long time reproduction, said servo circuit sets the travel speed of said magnetic recording medium to 1/N of that during normal recording, detects the level of a reproduction signal reproduced every N scanning operations of said rotary head at a predetermined timing and controls the travel of said magnetic recording medium such that said reproduction signal level is maximized to permit said recording/reproducing circuit to reproduce the reproduction signal at that timing.

3. A magnetic recording/reproducing apparatus according to claim 2, wherein during N-times long time recording, said servo circuit records a tracking signal on said magnetic recording medium at a period corresponding to once per rotation of said rotary head.

4. A magnetic recording/reproducing apparatus according to claim 2, wherein during N-times long time reproduction, said servo circuit controls the travel of said magnetic recording medium such that the level of a reproduction signal, which is reproduced every N scanning operations of said rotary head at a predetermined timing in relation to a criterion of a reproduction reference signal having a period corresponding to once per N scanning operations, is maximized.

5. A magnetic recording/reproducing apparatus according to claim 3, wherein during N-times long time reproduction, said servo circuit responds to said tracking signal to control the travel speed of said magnetic recording medium such that it is set to 1/N of that during normal recording, detects one of N scanning operations which is for maximizing the level of a reproduction signal and thereafter controls the travel of said magnetic recording medium such that the level of the reproduction signal at that scanning operation is maximized.

6. A magnetic recording/reproducing apparatus according to claim 2, wherein during N-times long time reproduction, said recording/reproducing circuit also reproduces a reproduction signal other than the reproduction signal which is so controlled as to have the maximum level by means of said servo circuit.

7. A magnetic reproducing apparatus for reproducing a digital signal recorded on a magnetic recording medium by means of a rotary head, comprising:

a reproducing circuit reproducing said digital signal; and a servo circuit controlling the rotation of said rotary head and the travel of said magnetic recoding medium, wherein during N-times long time reproduction, said servo circuit sets the travel speed of said magnetic recording medium to 1/N of that during normal recording, detects the level of a reproduction signal reproduced every N scanning operations of said rotary head at a predetermined timing and controls the travel of said magnetic recoding medium such that said reproduction signal level is maximized so as to permit a reproducing amplifier to reproduce the reproduction signal at that time.

8. A magnetic reproducing apparatus according to claim 7, wherein during N-times long time reproduction, said servo circuit controls the travel of said magnetic recording medium such that the level of a reproduction signal, which is reproduced every N scanning operations of said rotary head at a predetermined timing in relation to a criterion of a reproduction reference signal having a period which is once per N scanning operations, is maximized.

9. A magnetic reproducing apparatus according to claim 7, wherein during N-times long time reproduction, said servo circuit controls the travel speed of said magnetic recording medium such that it is set to 1/N of that during normal recording, detects one of N scanning operations which is for maximizing the level of a reproduction signal, and thereafter controls the travel of said magnetic recording medium such that the level of the reproduction signal at that scanning operation is maximized.

10. A magnetic reproducing apparatus according to claim 7, wherein during N-times long time reproduction, said reproducing circuit also reproduces a reproduction signal other than the reproduction signal which is so controlled as to have the maximum level by means of said servo circuit.

11. A magnetic recording apparatus for recording a digital signal on a magnetic recording medium by means of a rotary head, comprising:

said rotary head mounted with a first head group including oppositely disposed heads and a second head group including oppositely disposed N sets of heads;

a recording circuit having N recording signal output terminals; and a servo circuit controlling the rotation of said rotary head and the travel of said magnetic recording medium, wherein said apparatus has a first recording play mode in which during recording, a recording signal delivered out of one of the N recording signal output terminals of said recording circuit during recording is supplied to said first head group to perform recording of one track through one scanning operation and a second recording play mode in which during recording, N recording signals delivered out of the N recording signal output terminals of said recording circuit are supplied to said second head group to perform recording of N tracks through one scanning operation.

12. A magnetic recording apparatus according to claim 11, wherein said servo circuit multiplies the travel speed of said magnetic recording medium in said first recording play mode by N to provide the travel speed of said magnetic recording medium in said second recording play mode.

13. A magnetic recording apparatus according to claim 12, wherein in any recording play modes, said servo circuit records a tracking signal on said magnetic recording medium during recording at a period corresponding to once per rotation of said rotary head.

14. A magnetic recording/reproducing apparatus for recording/reproducing a digital signal on/from a magnetic recording medium by means of a rotary head, comprising:

said rotary head mounted with a first head group including oppositely disposed heads and a second head group including oppositely disposed N sets of heads;

a recording/reproducing circuit having N recording signal output terminals and N reproduction signal input terminals; and a servo circuit controlling the rotation of said rotary head and the travel of said magnetic recording medium, wherein said apparatus has a first recording/playback mode in which during recording, a recording signal delivered out of one of the N recording signal output terminals of said recording/reproducing circuit is supplied to said first head group to perform recording of one track through one scanning operation and during reproduction, a reproduction signal reproduced with said first head group at a rate of one track per scanning operation is supplied to one of the N reproduction signal input terminals of said recording/reproducing circuit to perform reproduction, and a second recording/playback mode in which during recording, N recording signals delivered out of the N recording signal output terminals of said recording/reproducing circuits are supplied to said second head group to perform recording of N tracks through one scanning operation and during reproduction, N reproduction signals reproduced with said second head group at a rate of N tracks per scanning operation are supplied to the N reproduction signal input terminals of said recording/reproducing circuit to perform reproduction.

15. A recording/reproducing apparatus according to claim 14, wherein said servo circuit multiplies the travel speed of said magnetic recording medium in said first recording/playback mode by N to provide the travel speed of said magnetic recording medium in said second recording/reproducing play mode.

16. A magnetic recording/reproducing apparatus according to claim 15, wherein in any recording/playback modes, said servo circuit records a tracking signal on said magnetic recording medium during recording at a period corresponding to once per rotation of said rotary head.

17. A magnetic recording/reproducing apparatus according to claim 14, wherein said servo circuit controls, during reproduction in said first recording/reproducing play mode, the travel of said magnetic recording medium such that the level of the reproduction signal reproduced with said first head group is optimized and controls, during reproduction in said second recording/playback mode, the travel of said magnetic recording medium such that the levels of the N reproduction signals reproduced with said second head group are optimized.

18. A magnetic recording/reproducing apparatus according to claim 17, wherein during reproduction in said second recording/playback mode, said servo circuit controls the travel of said magnetic recording medium such that the sum of levels of the N reproduction signals reproduced with said second head group is maximized.

19. A magnetic reproducing apparatus for reproducing a digital signal from a magnetic recording medium by means of a rotary head, comprising:

said rotary head mounted with a first head group including opposingly disposed heads and a second head group including opposingly disposed N sets of heads;

a reproducing circuit having N reproduction signal input terminals; and a servo circuit controlling the rotation of said rotary head and the travel of said magnetic recording medium, wherein said apparatus has a first playback mode in which during reproduction, a reproduction signal reproduced with said first head group at a rate of one track per scanning operation is supplied to one of the N reproduction input terminals of said reproducing circuit to perform reproduction and a second playback mode in which during reproduction, N reproduction signals reproduced with said second head group at a rate of N tracks per scanning operation are supplied to the N reproduction input terminals of said reproducing circuit to perform reproduction.

20. A magnetic reproducing apparatus according to claim 19, wherein said servo circuit multiplies the travel speed of said magnetic recording medium in said first playback mode by N to provide the travel speed of said magnetic recording medium in said second reproducing play mode.

21. A magnetic reproducing apparatus according to claim 19, wherein said servo circuit controls, during reproduction in said first playback mode, the travel of said magnetic recording medium such that the level of the reproduction signal reproduced with said first head group is optimized and controls, during reproduction in said second playback mode, the travel of said magnetic recording medium such that the levels of the N reproduction signals reproduced with said second head group are optimized.

22. A magnetic reproducing apparatus according to claim 21, wherein during reproduction in said second reproducing play mode, said servo circuit controls the travel of said magnetic recording medium such that the sum of levels of the N reproduction signals reproduced with said second head group is maximized.

* * * * *